United States Patent [19]

Hahn et al.

[11] Patent Number: 4,570,277
[45] Date of Patent: Feb. 18, 1986

[54] LEVELER ASSEMBLY

[75] Inventors: Norbert Hahn, South Milwaukee; Michael A. Swessel, Cudahy, both of Wis.

[73] Assignee: Rite-Hite Corporation, Milwaukee, Wis.

[21] Appl. No.: 612,439

[22] Filed: May 21, 1984

[51] Int. Cl.$^4$ ............................................. E01D 1/00
[52] U.S. Cl. ..................... 14/71.3; 14/71.1; 134/104; 134/198; 239/289
[58] Field of Search ................ 14/71.1, 71.3; 134/104, 134/198, 200; 239/289

[56] References Cited

U.S. PATENT DOCUMENTS

| Re. 30,250 | 4/1980 | Catlett | 14/71.3 |
|---|---|---|---|
| 3,291,144 | 12/1966 | Diamond | 239/289 X |
| 3,323,158 | 6/1967 | Loomis | 14/71.3 |
| 3,465,761 | 9/1969 | Meeker et al. | 134/200 X |
| 4,018,239 | 4/1977 | Caldwell et al. | 134/200 X |
| 4,068,338 | 1/1978 | Artzberger | 14/71.3 |
| 4,416,120 | 11/1983 | Yono et al. | 134/200 X |
| 4,453,282 | 6/1984 | Larsen | 14/71.1 |

Primary Examiner—James A. Leppink
Assistant Examiner—Beverly E. Hjorth
Attorney, Agent, or Firm—Neuman, Williams, Anderson & Olson

[57] ABSTRACT

A leveler assembly is provided for use within a pit formed in the platform surface of a loading dock. The pit is of conventional construction and includes a recessed horizontal base surface, upright side and rear walls and an open front. The assembly includes a stationary frame mounted within the pit and having an upright section disposed adjacent the pit rear wall and a forwardly extending section mounted on the pit base surface; the latter section effects segregation of the base surface into large contiguous areas, on which debris accumulates, each area being defined in part by the pit open front. A deck member is provided having a rear edge portion thereof hingedly connected to the upright frame section. The deck member, when not in use, normally assumes a neutral position whereby the exposed surface thereof is coplanar with the dock platform surface so as to allow cross-traffic to safely pass thereover. When the deck member assumes a predetermined raised position, the pit base surface areas are accessible and the accumulated debris removable therefrom through the pit open front.

10 Claims, 7 Drawing Figures

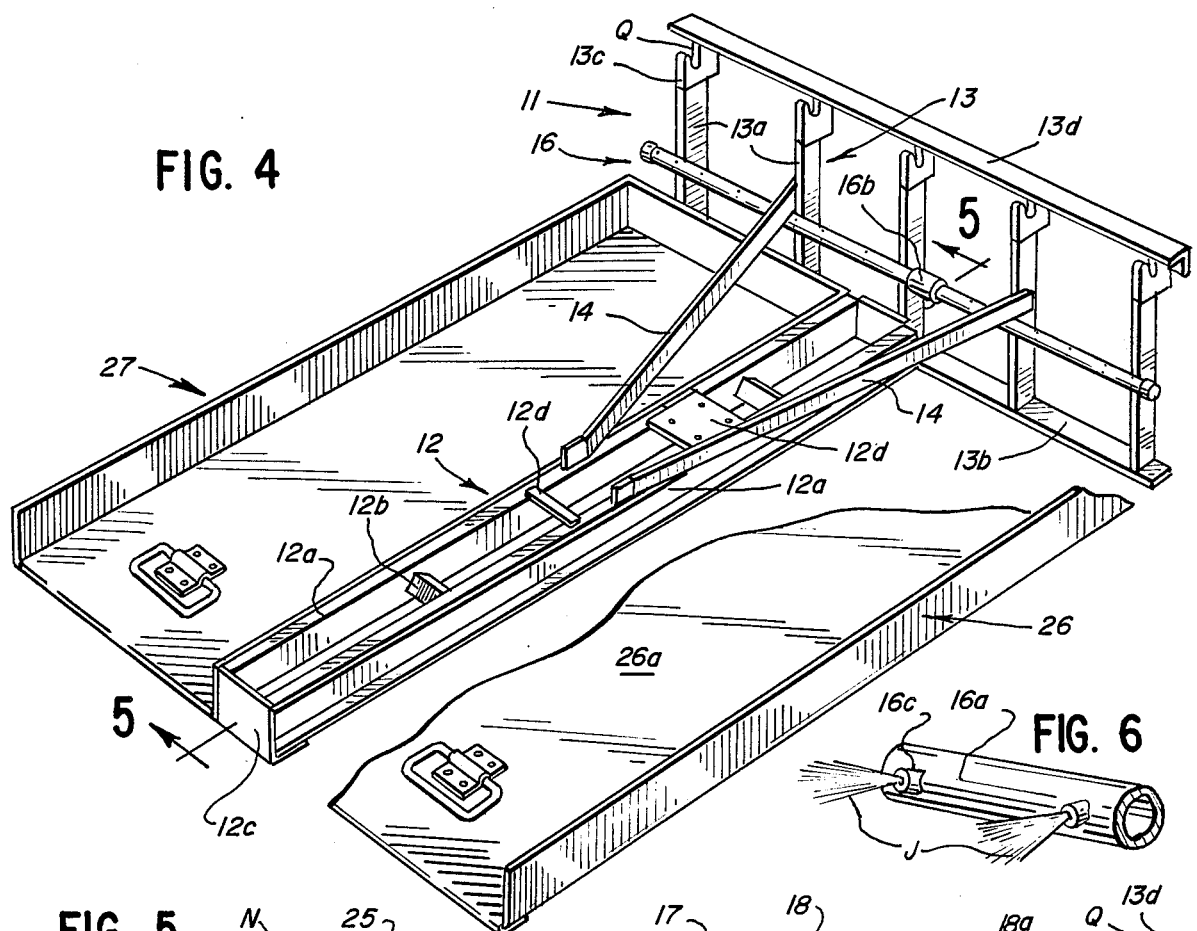
FIG. 4
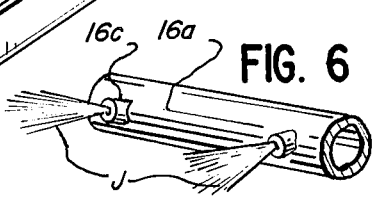
FIG. 6
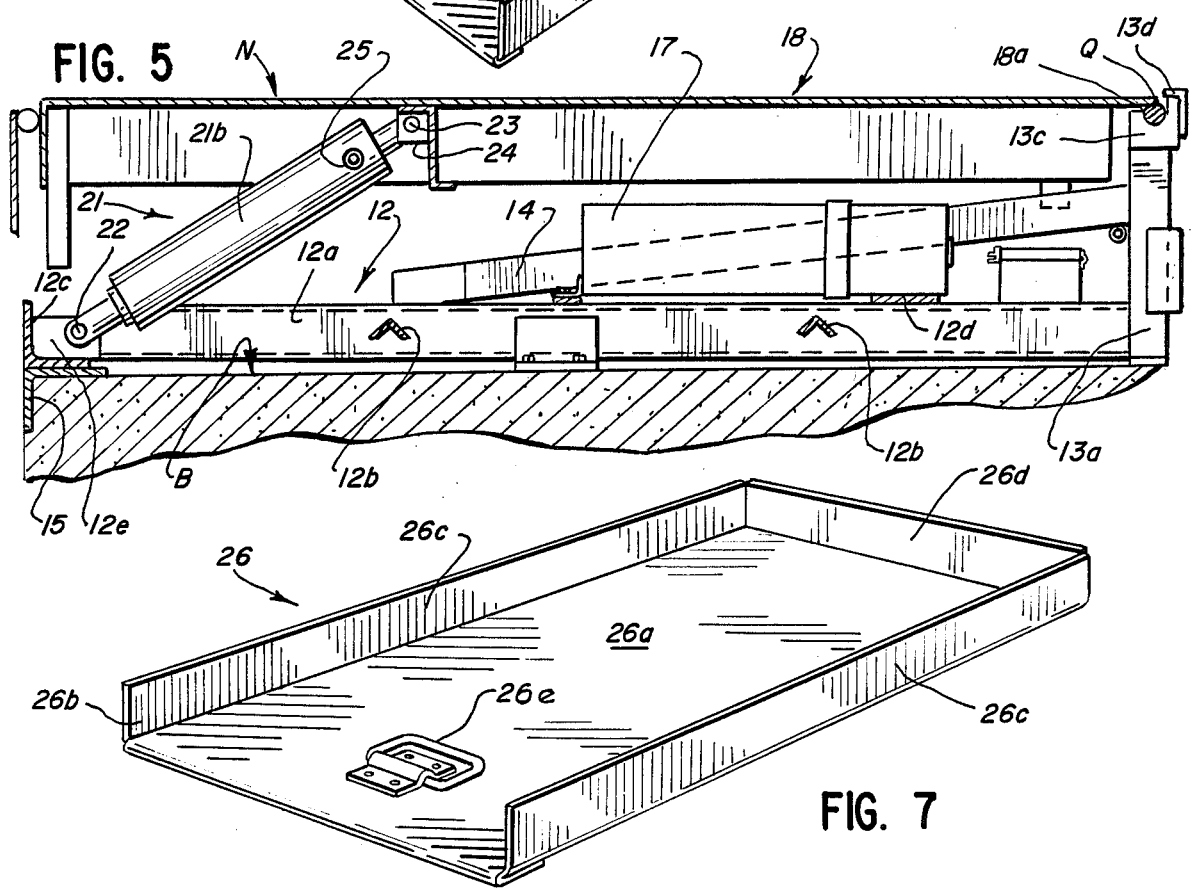
FIG. 5
FIG. 7

LEVELER ASSEMBLY

BACKGROUND OF THE INVENTION

In the loading and/or unloading of various vehicles parked at a loading dock wherein a dock leveler assembly is installed, the pit in which leveler assembly is located frequently accumulates, after a relatively short period of time, a substantial amount of debris. Where the dock is associated with a warehousing facility for food and the like, sanitary rules and regulations frequently require that the dock leveler and pit therefor be cleaned on a regular basis. Such a cleaning operation is a dirty, undesirable task requiring a substantial amount of time and manual effort. Furthermore, unless care is exercised the cleaning operation can be hazardous to the person performing the operation, as well as to various components comprising the assembly.

SUMMARY OF THE INVENTION

Thus, it is an object of the invention to provide a dock leveler assembly which is of simple, yet durable, construction and is provided with built-in means for facilitating removal of debris from the pit in which the assembly is installed.

It is a further object to provide a leveler assembly wherein a minimal amount of time and manual labor is required to maintain the pit, in which the assembly is located, in a condition which meets various sanitary rules and regulations regarding the use of such a dock leveler assembly in warehousing facilities for foods and the like.

It is a further object to provide a dock leveler assembly wherein the frame thereof permits ready, unobstructed access to the base surface of the pit to facilitate removable of debris accumulated thereon.

Further and additional objects will appear from the description, accompanying drawings and appended claims.

In accordance with one embodiment of the invention, a leveler assembly is provided for use within a conventional pit formed in the platform surface of a loading dock to accommodate such as assembly. The pit includes a substantially horizontal base surface, which is recessed from the platform surface, upright side and rear walls and an open front. The leveler assembly embodies a stationary frame mounted within the pit and having an upright rear section thereof disposed adjacent the pit rear wall and a forwardly extending section mounted on the pit base surface. The forwardly extending frame section effects segregation of the pit base surface into large areas terminating at the pit open front. Hingedly connected to the upright frame section is the rear edge portion of a deck member. The deck member, when not in use, normally assumes a neutral position wherein it overlies the top of the pit and the exposed surface of the deck member is substantially coplanar with the dock platform surface thereby allowing cross-traffic to safely pass thereover. When the deck member is raised, the debris which has accumulated on the segregated areas of the pit base surface can be readily removed therefrom through the pit open front.

DESCRIPTION

For a more complete understanding of the invention reference should be made to the drawings wherein:

FIG. 4 is an enlarged fragmentary top perspective view of the leveler assembly per se but with the deck member and associated piston-cylinder unit removed.

FIG. 5 is an enlarged fragmentary sectional view taken along line 5-5 of FIG. 4 but with the deck member and associated piston-cylinder unit in place and the deck member in its neutral position.

FIG. 6 is an enlarged fragmentary perspective view of a portion of the spray unit embodied in the leveler assembly of FIG. 2.

FIG. 7 is an enlarged top perspective view of a debris-collecting tray forming a component of the leveler assembly of FIG. 2.

Figure 1:
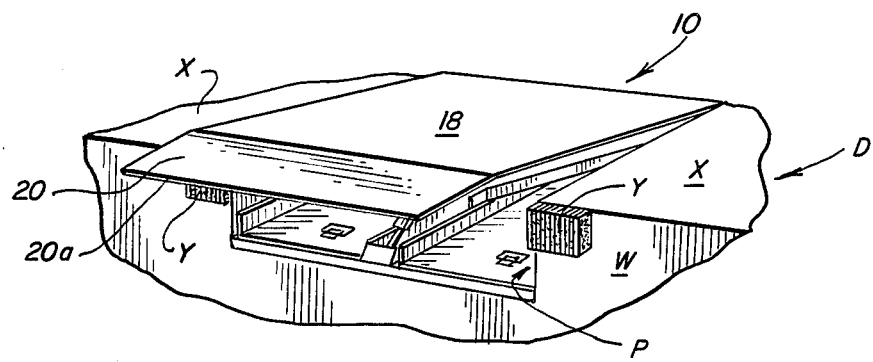
FIG. 1 is a fragmentary top perspective view of one embodiment of the improved leveler assembly installed in the pit of a conventional loading dock and showing the deck member in a slightly raised position relative to the dock platform surface.
Figure 2:
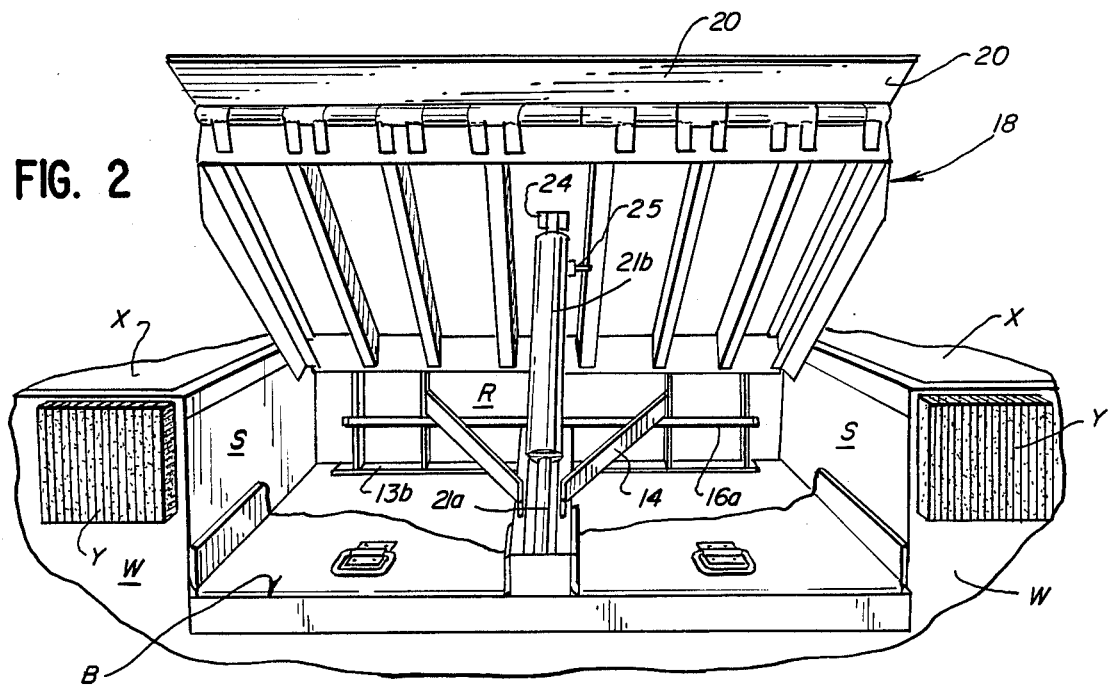
FIG. 2 is an enlarged fragmentary front perspective view of the leveler assembly of FIG. 1; but showing the deck member thereof in a fully raised position.

Referring now to the drawings and more particularly to FIGS. 1 and 2, one embodiment of the improved leveler assembly 10 is shown installed in a pit P of conventional design provided in the platform surface X of a loading dock D. The pit is defined by a substantially horizontal base surface or floor B and upstanding side and rear walls, S and R, respectively. The top and front of the pit are open. The open front of the pit is flush with the depending front wall W of the loading dock D, and the pit base surface B is elevated relative to the driveway, not shown, on which a vehicle is parked when located at the loading dock.

Mounted on the dock wall W and adjacent to, but spaced from, the pit side walls are conventional bumpers Y which are engaged by the rear of the vehicle, when the latter is backing into a parked position relative to the dock leveler assembly 10. The bumpers prevent the vehicle from striking and damaging various components of the leveler assembly as will be described more fully hereinafter.

The leveler assembly 10 is particularly suitable for use in a loading dock wherein food products and the like, which are susceptible to contamination, are being loaded and unloaded. In such loading and unloading operations, the operator of the dock facility is oftentimes required to comply with various sanitary regulations which necessitates frequent and thorough cleaning of the facility so as to reduce the possibilities of contaminating the products being handled at the loading dock. Because of the open top and front of the pit and the normal exposure of the dock facility to various climatic conditions, the pit is highly susceptible to collecting therein debris of various types. Heretofore, the removal of such debris was an awkward and timeconsuming operation requiring an inordinate amount of manual labor. In addition to the pit base surface oftentimes not being readily accessible to pesonnel responsible for performing the debris removal operation due to the location of certain components of a conventional dock leveler assembly and accessory equipment located in the vicinity of the pit open front, the removal operation can be hazardous to such personnel unless care is exercised in properly blocking the deck member and the lip plate hingedly attached thereto from accidentally and unexpectedly pivoting downwardly towards the pit base surface while the debris is being manually removed therefrom. Heretofore because such debris oftentimes strongly adhered to the base surface or various components of the leveler assembly it was necessary to employ various tools (e.g., shovel, pick ax, rake, etc.) to dislodge the debris. As a result, the person utilizing such tools needed to exercise care so as not to damage any of the assembly components disposed within the pit. Thus, the improved leveler assembly 10 avoids these problems.

Assembly 10 includes a stationary frame 11 having a first section 12, which rests upon and is anchored to the pit base surface B and a second section 13, which is disposed adjacent the rear wall R of the pit and extends upright from the rear or inner end of the frame first section 12. Second section 13 is retained in its upright position relative to the first section 12 by a pair of brace pieces 14, see FIG. 4 extending upwardly and rearwardly from the first section.

Frame first section 12 is relatively narrow and is centrally disposed on the pit base surface B and substantially equidistant from the side walls S. Section 12 may be formed of a pair of elongated channel members 12a which are disposed in parallel spaced relation and are retained in such relation by a plurality of cross pieces 12b which are welded to the respective channel members.

The outer ends of the channel members 12a are substantially flush with the pit open front. An angle piece 12c, see FIG. 5, is affixed to the respective outer ends of the channel members. The angle piece 12c, in turn, is welded to a second angle piece 15 which extends transversely thereof and overlies the corner of the pit formed by the intersection of the base surface B and the dock front wall W. Angle piece 15 preferably extends the full width of the pit and is suitably anchored to the dock.

As noted in FIG. 4, frame second section 13 includes a plurality of upright posts 13a which are arranged in uniformly spaced parallel relation. The lower ends of the posts are secured to a lower cross member 13b which extends substantially the full width of the pit. The inner end of frame first section 12 is welded to cross member 13b. Angle piece 15 and cross member 13b are disposed in parallel relation.

Affixed to the upper end of each post 13a is an enlarged head piece 13c. The piece 13c is provided with an upwardly extending open end slot Q, the function of which will be described more fully hereinafter. Disposed rearwardly of the slot Q is an angle brace 13d which interconnects the post head pieces 13c and thus, maintains the posts in proper spaced relation.

Figure 3:
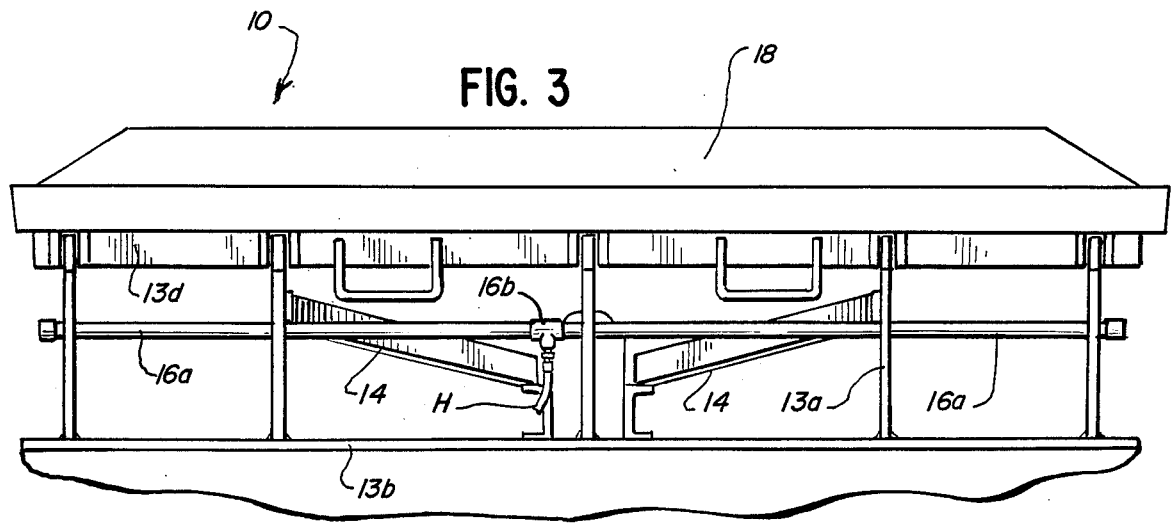
FIG. 3 is an enlarged fragmentary rear perspective view of the leveler assembly of FIG. 2 but with the rear wall of the pit removed.

In the illustrated embodiment, an elongated spray unit 16 is mounted at approximately mid-height on the posts 13a. The unit extends crosswise of the pit and includes a tubular member or pipe section 16a which is secured by suitable means to a predetermined number of posts 13a. A tee-connector 16b is disposed at approximately mid-length of the pipe section 16a, see FIGS. 3 and 4 and is connected by suitable hose 14 to a suitable source of pressurized fluid, not shown.

The pipe section 16a of the spray unit 16 is provided with a plurality of longitudinally spaced nozzles 16c, see FIG. 6 arranged in one or more rows. The nozzles in a given row may be arranged so that each nozzle emits a jet of pressurized fluid forwardly and downwardly towards the pit base surface B and the nozzles in other rows emit jets of pressurized fluid forwardly and upwardly so as to impinge on the deck member when the latter is in a neutral position or in proximity thereto as will be described hereinafter. Where only one row of nozzles is provided some of the nozzles may be directed forwardly and upwardly and the other directed forwardly and downwardly. The pressurized fluid may be water, steam or a chemical solution.

Overlying the open top of the pit is a conventional deck member 18, sometimes referred to as a dockboard. The deck member has a configuration closely approximating that of the pit open top. Hingedly connected to the front edge of the deck member is a conventional lip plate 20. When the leveler assembly 10 is in an operative mode—that is to say, a parked vehicle is being loaded or unloaded—the lip plate 20 assumes an extended position as seen in FIG. 1, and the outer edge portion 20a of the plate will rest upon the rear end of the trailer or truck bed of the vehicle, not shown, parked at the dock. The plate 20 spans any gap formed between the end of the trailer or truck bed and the outer edge of the deck member.

The inner edge of the deck member is provided with an elongated pivot bar 18a which is affixed to the underside of the deck member 18, see FIG. 5. The pivot bar is of such a diameter that it will slidably fit within the slots Q formed in the head pieces 13c affixed to the upper ends of posts 13. The size of the open upper end of each slot Q is such that the deck member 18 can pivot upwardly from a horizontal neutral position N (FIG. 5) through a sector of approximately 30°. Furthermore, the slot openings allow the deck member 18 to pivot downwardly from the neutral position N through a sector of approximately 10°.

When the deck member is disposed in its neutral position N, the lip plate 20 assumes a depending position and the outer edge 20a thereof engages keepers, not shown, which may be mounted on angle piece 15. When the lip plate engages the keepers, the plate 20 cannot be pivoted unless the deck member is pivoted upwardly a sufficient amount so that the lip plate outer edge is disengaged from and is clear of the keepers. The use of keepers are well known in the art and form no part of the claimed invention.

When the lip plate engages the keepers, the front edge portion of the deck member 18 is effectively supported so that the exposed surface of the deck member 18 is in coplanar relation with the dock platform surface X and thus, safely permits cross-traffic over the deck member.

Furthermore, when the deck member assumes its neutral position, the top and front of the pit are closed, thus, the pressurized fluid jets emitted from the spray unit 16 will be confined within the pit and be more effective in loosening the debris from the pit base surface and the underside of the deck member and lip plate.

If it is necessary to lower the deck member 18 from the neutral position N so as to end load the bed of the parked vehicle, the deck member must first be raised so that the lip plate clears the keepers and then the lip plate is pivoted outwardly as the deck member is lowered. Depending feet or posts affixed to the underside of the front edge of the deck member limit the downward movement of the deck member from the neutral position.

Raising and lowering of the deck member 18 about the pivot bar 18a as an axis is effected by a piston-cylinder assembly 21, see FIGS. 2 and 5 which is mounted beneath the deck member 18. The exposed end of the piston 21a is pivotally connected at 22 to a flange 12e formed on the angle piece 12c. The opposite end of the piston is concealed within the cylinder 21b. The upper end of the cylinder is pivotally connected at 23 to a bracket 24 depending from the underside of the deck member 18 and disposed forwardly a substantial distance from the pivot bar. A suitable port 25 is provided near the upper end of the cylinder through which hydraulic fluid can flow. A suitable hydraulic fluid pump 17 is preferably mounted on brackets 12d carried on the frame first section 12, see FIG. 5.

Slidably supported on the pit base surface B and located on opposite sides of the frame first section 12 is a pair of trays 26, 27, which in the illustrated embodiment are of like construction and thus, only tray 26 shown in FIG. 7 will be described in detail hereinafter. Tray 26 is provided with a bottom panel 26a which conforms substantially to the area of the pit base surface delineated by the frame sections 12 and 13, and a side wall of the pit. The front end 26b of the tray is open and, when the tray is fully positioned within the pit, it is substantially flush with the open front of the pit. A handle 26e is hingedly mounted on the bottom panel 26a and in close proximity to the open front end 26b. The handle facilitates manual manipulation of the tray within the pit. Side and end walls 26c, 26d extend upwardly from the perimeters of the bottom panel 26a. When the tray is properly positioned within the pit base surface B, debris will accumulate on the tray bottom panel. To facilitate removal of the debris from the tray bottom panel 26a, jets of fluid may be required from the spray unit 16 causing the debris accumulated on the tray panel 26a to be loosened therefrom. The spray unit is activated when the deck member 18 is in its neutral position or in close proximity thereto.

Subsequent to the spray unit being deactivated, the deck member is moved to a raised position such as shown in FIG. 2. The deck member is retained in such raised position by manipulating a selective control valve, not shown, which is associated with the piston-cylinder assembly 21. While the deck member 18 is retained in the raised position, the trays 26, 27 are manually pulled outwardly approximately two-thirds to three-quarters of their length through the open front end of the pit. The protruding portion of each tray is then tilted downwardly approximately 30°–45° about the corner of angle piece 15 as a fulcrum. When the tray assumes its downwardly tilted position, the loosened debris accumulated on the bottom panel of the tray can be readily removed therefrom by gravity through the open front into a suitable waste container or bucket, not shown. Any debris which remains attached to the base panel can be removed by a rake or hoe-like tool. The aforenoted procedure may be repeated, if necessary, so that the pit area meets the sanitary requirements. To remove any debris from the base surface of the pit, the trays 26, 27 are completely removed from the pit and the spray unit activated after the deck member has resumed its neutral position. After the spray unit has been subsequently deactivated and the deck member moved to its raised position, the debris on the base surface is removed therefrom out through the pit open front by a suitable tool.

In some installations, the trays may be eliminated entirely thereby allowing the debris to accumulate directly on the pit base surface. In still other embodiments of the improved leveler assembly, the spray unit may be eliminated and the underside of the deck member and the pit base surface be hosed-down by personnel from a hose connected to a remote spigot and thus utilizing the water, or steam available in the warehouse or plant. In this latter situation the deck member and the lip plate assume the positions as shown in FIG. 2.

Thus, it will be noted that an improved dock leveler assembly has been provided which may be utilized in loading and unloading operations involving food products and the like which are susceptible to contamination and the like. The leveler assembly may be installed within pits of conventional size and shape. The cleaning of the leveler assembly and the pit therefor is a simple operation which involves a minimum amount of time and manual effort.

We claim:

1. A leveler assembly for use within a pit formed in the platform surface of a loading dock, the pit having substantially horizontal recessed base surface, side and rear walls extending upwardly therefrom, and an open front and top; said assembly comprising a stationary frame adapted to be fixedly anchored within the pit, said frame including an upright section positionable adjacent the pit rear wall, and a single forwardly extending narrow section affixed to said upright section and mountable on the pit base surface and terminating at substantially the pit open front, the terminating end of the narrow section being free of any other segment of the frame, said narrow section effecting segregation of the pit base surface into a pair of large contiguous substantially unobstructed areas, each area being defined in part by the pit open front; and a deck member hingedly mounted on said frame upright section for normally assuming a neutral position of hinged adjustment whereby said deck member simultaneously overlies the contiguous areas and the exposed surface of said deck member is substantially coplanar with the dock platform surface; the segregated areas of the pit base surface being exposed and accessible for removing debris therefrom through the pit open front when the deck member assumes a predetermined upwardly hinged position.

2. The leveler assembly of claim 1 wherein said frame forwardly extending section is adapted to be disposed substantially equidistant from the pit side walls.

3. The leveler assembly of claim 1 wherein the frame forwardly extending section has connected thereto means for controlled upward tilting of the deck member from the neutral position.

4. The leveler assembly of claim 3 wherein the controlled tilting means includes a piston-cylinder unit having one end thereof pivotally connected to the frame forwardly extending section and a second end pivotally connected to the underside of the deck member at a location spaced forwardly a substantial distance from the deck member hinge axis.

5. The leveler assembly of claim 1 wherein the frame includes tray means positionable adjacent the pit base surface and slidably mounted for movement relative between a debris-catching position wherein the tray means is substantially fully disposed within the pit and is in spaced registered relation with the deck member when the latter is in the neutral position, and a debris-removing position wherein the tray means projects outwardly a substantial distance through the pit open front.

6. The leveler assembly of claim 5 wherein the tray means includes a handle for effecting manual movement of the tray means relative to the pit base surface.

7. The leveler assembly of claim 5 wherein the tray means has upright peripheral side and rear walls and an open front side adjacent the pit open front when said tray means is in the debris-catching position.

8. The leveler assembly of claim 1 wherein the frame includes a pair of tray means, one for each segregated surface area; each tray means being slidably mounted adjacent a corresponding surface area for independent movement between a debris-catching position wherein the tray means is substantially fully disposed within the pit in spaced subtending relation with the deck member, when the latter is assuming the neutral position, and substantially overlies a segregated area of the pit base surface, and a debrisremoval position wherein the tray means is pulled a substantial distance out through the pit open front and then the outwardly projecting portion of the tray means is tilted downwardly a predetermined amount relative to the pit open front while the deck member is in an upwardly hinged position.

9. A leveler assembly for use within a pit formed in the platform surface of a loading dock, the pit having a substantially horizontal recessed base surface, side and rear walls extending upwardly therefrom, and an open front and top; said assembly comprising a stationary frame adapted to be anchored within the pit, said frame including an upright section positionable adjacent the pit rear wall; a deck member hingedly mounted on said frame section for normally assuming a neutral position of hinged adjustment wherein the pit open top is substantially closed thereby and the exposed surface of the deck member is adapted to be substantially coplanar with the dock platform surface; and means for removing debris accumulated on the pit base surface, said means including an elongated spray unit connected to a source of pressurized fluid and being mounted on the frame section and elevated relative to the pit base surface and spanning substantially the distance between the pit side walls, said spray unit having a predetermined number of jet forming means facing outwardly from the frame section and generally towards the base surface and the open front of the pit whereby jets of fluid are emitted from said unit and impinge on the pit base surface and the debris accumulated thereon and assist in the removal of the debris through the pit open front.

10. The leveler assembly of claim 9 wherein the frame includes a single forwardly extending narrow section adapted to be mounted on the pit base surface and substantially equidistant from the pit side walls whereby the pit base surface is segregated into a pair of large contiguous surface areas of substantially like configuration, each surface area being defined in part by the pit open front.

* * * * *